United States Patent

[11] 3,568,073

[72] Inventor William G. McGuffin
Willingboro, N.J.
[21] Appl. No. 758,458
[22] Filed Sept. 9, 1968
[45] Patented Mar. 2, 1971
[73] Assignee the United States of America as represented by the Secretary of the Navy

[54] LOGARITHMIC ATTENUATOR
3 Claims, 3 Drawing Figs.

[52] U.S. Cl. .......... 328/145, 307/29, 307/260
[51] Int. Cl. .......... G06g 7/24
[50] Field of Search .......... 328/145; 307/229, 237; 333/81 (A), 81 (B), 81 (C)

[56] References Cited
UNITED STATES PATENTS

| | | | |
|---|---|---|---|
| 3,108,197 | 10/1963 | Levin .......... | 328/145X |
| 3,197,627 | 7/1965 | Lewis .......... | 328/145X |
| 3,317,756 | 5/1967 | Laporte .......... | 307/237 |

*Primary Examiner*—Donald D. Forrer
*Assistant Examiner*—B. P. Davis
*Attorneys*—R. I. Tompkins and L. I. Shrago

ABSTRACT: The logarithmic attenuator disclosed consists of a cascade of L-sections, each section comprising a series resistor and a shunt impedance formed by a parallel pair of forwardly biased diodes. These diodes are in series with a control voltage and consequently share a common control current. One of the diodes serves to isolate the input signal form the low impedance control voltage source, thereby allowing this voltage to be applied directly to the diodes so as to preserve their logarithmic characteristic.

INVENTOR.
WILLIAM G. MCGUFFIN

LOGARITHMIC ATTENUATOR

The invention described herein may be manufactured and used by or for the Government of the United States of America for governmental purposes without the payment of any royalties thereon or therefor.

The present invention relates generally to voltage control logarithmic attenuators of the type utilizing semiconductor diodes as the nonlinear resistance elements.

Numerous electrical circuits have been devised which produce an output voltage proportional to the logarithm of the input voltage. In all of these circuits, the essential component is a nonlinear resistance which may be, for example, a vacuum tube, thermistor or a semiconductor diode. In one type of logarithmic attenuator employing semiconductor diodes, these diodes form the shunt arms of a plurality of cascaded L-sections, the series arms of which contain appropriate resistors. These diodes are forwardly biased by a DC control current so that their forward incremental resistance determines the signal attenuation of each section of the attenuator.

In such an attenuator as the one just described, the DC current voltage characteristic of each forward biased junction diode may be expressed analytically by:

$$(1) \qquad I = I_S\,[\exp\,(qV/nKT) - 1\,]$$

Where $I$ is the forward current of the diode, $I_S$ is the saturation current of the diode, $q$is the charge of a simple electron, $V$is the junction voltage, $n$is a constant depending upon the material and geometry of the junction, $K$is Boltzmann's constant and $T$is the absolute temperature. When an initial bias current large compared with the saturation current is employed, equation (1) may be reduced to:

$$(2) \qquad I = I_S \exp\,(qV/nKT)$$

The forward incremental resistance ($r_d$) of the junction may be found by differentiating equation (2):

$$(3) \qquad \frac{dI}{dV} = I_S(q/nKT)\ \exp\ (qV/nKT) = \frac{qI}{nKT}$$

and $r_d$ may be expressed as:

$$(4) \qquad r_d = \frac{nKT}{qI} = \frac{nKT}{qI_S}\ \exp\ (-qV/nKT)$$

Thus, from equation (4), it can be seen that $r_d$ is an inverse function of the bias current $I$ and an exponential function of the junction voltage $V$. This exponential relationship between $r_d$ and $V$ provides the mechanism required for a logarithmetic attenuator. If the junction voltage of the diode can be controlled, the attenuation of the network will be logarithmic as a function of the control voltage and may be expressed as:

$$(5) \qquad A_{(db)} = -C \log \left(\frac{e_o}{e_i}\right) = -KV_c$$

where $C$ and $K$ are positive constants determined by the circuit parameters.

Previous circuits have utilized a variety of different techniques to apply the DC control voltage to the diodes without affecting the impedance of the circuit at the input signal frequency. In one type of circuit, the control voltage is applied through a series resistor. However, with such an arrangement, the value of the resistor must be large compared to the forward incremental resistance of the diode in order to prevent the added resistor from altering the impedance of the circuit and upsetting the attenuator response. Unfortunately, when this relationship is satisfied, the bias current of the diode is determined primarily by this resistor and departs radically from the exponential voltage dependency desired. The circuit, therefore, is useful for linear attenuators and has only a very limited logarithmic range.

To compensate for this shortcoming, some circuits include a series zener diode with this resistor to precondition the bias current. This diode is operated in its Zener knee to provide a current response which is nearly logarithmic to achieve the desired results. However, the Zener diode, its operating point characteristic and the value of the control voltage for a given attenuation must be carefully matched; and in a multiple section attenuator utilizing a common control voltage, the Zener diodes associated with the different sections must be matched sets.

The required isolation between the control voltage source and the AC input signal has been achieved by using an inductor as the series element with the diode. While this does work well over a restricted frequency range, it does introduce phase displacements which cannot be tolerated in many applications. Furthermore, this circuit does not lend itself to high density packaging of components because of the physical size of the inductor element.

It is accordingly a primary object of the present invention to provide a voltage controlled logarithmic attenuator wherein the control voltage may be applied without undesirable loading of the circuit.

Another object of the present invention is to provide a voltage controlled logarithmic attenuator which acts essentially as a resistive network so as to bring about minimum phase displacement of the input signal.

Another object of the present invention is to provide a voltage controlled logarithmic attenuator which has a wide bandwidth response and does not require critical components or frequency compensating networks.

Other objects, advantages and novel features of the invention will become apparent from the following detailed description of the invention when considered in conjunction with the accompanying drawings wherein.

Figure 1:
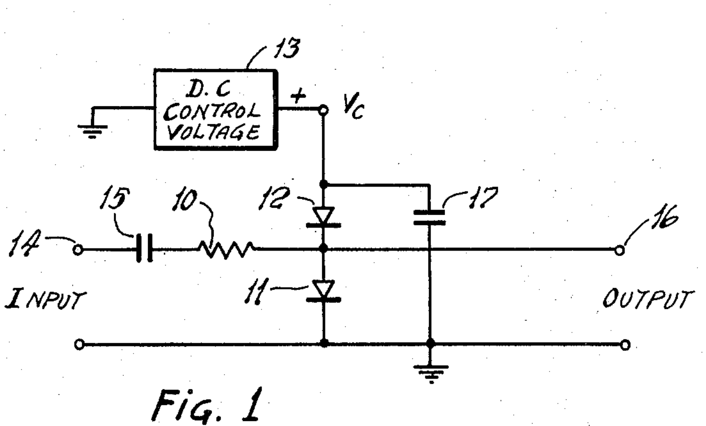
FIG. 1 illustrates a single L-section constructed according to the present invention.

Referring now to FIG. 1 of the drawings, it will be seen that each L-shaped section of the attenuator consists of a series resistor 10 and a pair of shunt diodes 11 and 12. Diodes 11 and 12 are in series across a DC control voltage 13. Consequently, both diodes share a common control current and the shunt impedance of the section is formed by the forward incremental resistance $r_d$ of these diodes in parallel.

The AC input signal appearing at terminal 14 is applied to the L-section through coupling capacitor 15. The output signal appears at terminal 16 connected to the junctions of the diodes. Capacitor 17 is included in the circuit to provide a low impedance path for the signal frequency.

In the above arrangement both diodes are operated at similar points along their current voltage characteristics. Consequently, the matching problem is simplified since the characteristic of the network is determined by the average characteristic of the two diodes. Diode 12 isolates the signal frequency from the low impedance controlled voltage source 13 but still allows this control voltage to be applied directly to the diodes without any intervening impedance network. This feature preserves the desired logarithmic characteristic of the diodes. When high speed computer-type diodes are utilized, the circuit is essentially a resistive network. It has a stable characteristic over a wide range of frequencies without undue phase displacements. What phase displacements do occur, usually appear at extremely high frequencies.

Figure 2:
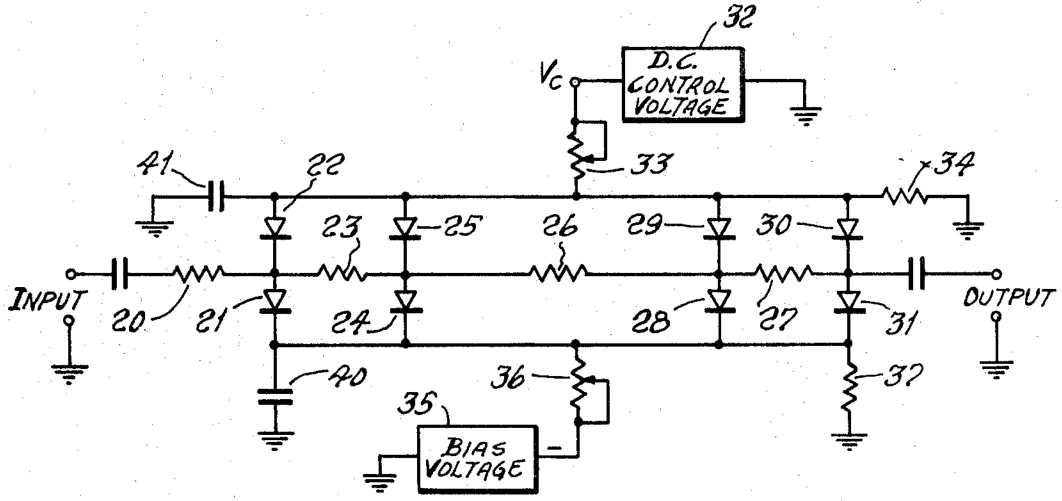
FIG. 2 illustrates a complete attenuator fabricated from a multiplicity of such L-shaped sections.

In FIG. 2 there is shown a complete circuit of a logarithmic attenuator utilizing the above L-shaped sections in cascade. This circuit may be used to provide an output signal for a logarithmic automatic gain control system. In this arrangement, the first L-section consists of series resistor 20 and diodes 21 and 22; the second, resistor 23 and diodes 24 and 25; the third and fourth, series resistors 26, 27 and diodes 28, 29, 30 and 31. The common control voltage 32 is applied by a resistance divider network made up of variable resistor 33 and fixed resistor 34 to one side of all the series diodes pairs. A DC bias voltage 35 is applied by a second divider network made up of variable resistors 36 and fixed resistor 37 to the other side of these diode pairs. Voltage supply 35 and its divider network provide an initial bias voltage to the diode networks and establish an initial value for the forward incremental $r_d$.

Resistor 37 has a small value compared to the static resistance of the diodes and, as such, appears as a constant voltage bias source. Likewise, resistance 34 in the divider network associated with control voltage 32 is of a small value and also acts as a constant voltage source. Capacitors 40 and 41 connecting the opposite ends of the diode networks to ground provide a low impedance path for the input signals.

Figure 3:
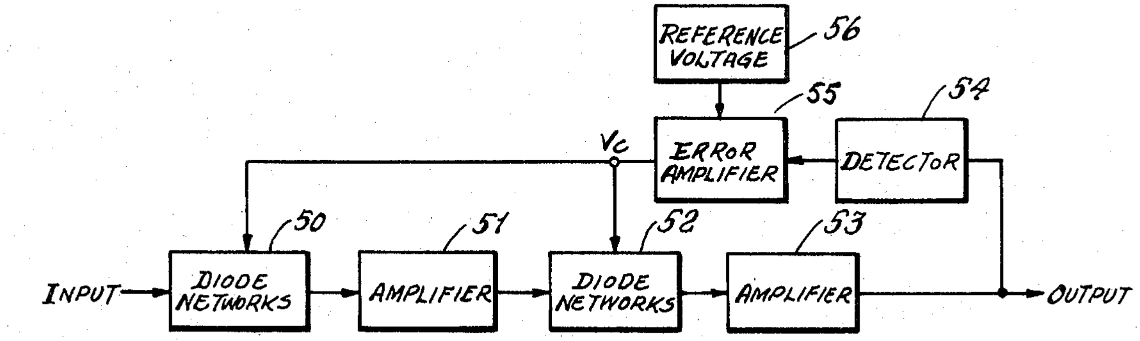
FIG. 3 is a block diagram showing a typical application of the logarithmic attenuator to an automatic gain control system.

The number of L-sections needed in any given application is determined primarily by the calibrated range desired and the degree of accuracy required. In general, however, the number of these networks is proportional to both the attenuation range and the accuracy sought. Where a large number of diode networks is needed, it may be desirable to incorporate amplifiers between networks to prevent the signal being attenuated to a level which might result in degradation of the signal-to-noise ratio. A typical example of such an arrangement employed in an automatic gain control system is shown in FIG. 3. Here, the input signal is applied to a first attenuator 50 made up of a predetermined number of L-shaped sections and the resultant attenuated signal is applied to an amplifier 51. The output of this amplifier is fed to a second attenuator 52 and the resulting attenuated signal is fed to a second amplifier 53. In the automatic gain control circuit shown, the output of amplifier 53 is detected at circuit 54 and the DC voltage produced serves as one input to an error amplifier 55 whose other input is in a reference voltage 56. The output of the error amplifier serves as the common control voltage to automatically change the condition of the various individual attenuators 50 and 52. As mentioned hereinbefore, the insertion of amplifiers 51 and 53 between the cascaded attenuators preserves the signal-to-noise ratio over a wide dynamic range of input signal amplitudes.

The response time of the AGC system can be tailored to almost any value desired by the appropriate selection of the detector filter time constants.

Obviously many modifications and variations of the present invention are possible in the light of the above teachings. It is therefore to be understood that within the scope of the appended claims the invention may be practiced otherwise than as specifically described.

I claim:

1. A logarithmic attenuator comprising, in combination:
a resistor;
a first diode connected between one end of said resistor and a reference potential;
a source of DC control voltage having its negative terminal connected to said reference potential;
a second diode connected between the positive terminal of said source of DC control voltage and said one end of said resistor;
said first and second diodes being poled such that said DC control voltage establishes the same initial amount of conduction current through both diodes;
a capacitor connected across said source of DC control voltage;
means for applying an input signal across the series combination of said resistor and said first diode; and
means for extracting an output signal across said first diode.

2. A logarithmic attenuator comprising, in combination:
a pair of diodes;
a source of DC control voltage;
means for connecting said pair of diodes in series across said source of DC control voltage such that a given amount of conduction current normally flows through said diodes as determined by the amplitude of said control voltage;
a capacitor connected across said series pair of diodes;
a resistor having one end thereof connected to the midpoint of said series pair of diodes,
said resistor constituting the series arm of an L-shaped impedance section, the shunt arm of which includes the parallel combination of one of said conducting diodes and the other of said conducting diodes in series with said capacitor;
means for applying an input signal across the series combination of said resistor and said one of said diodes; and
means for extracting an output signal across this last-mentioned diode.

3. A voltage control logarithmic attenuator having a substantially resistive characteristic which results in a minimum phase displacement of the input signal comprising, in combination:
a multiplicity of L-shaped impedance sections, each section having a resistor as its series arm and a first diode as its shunt arm,
said multiplicity of L-shpaed impedance sections being interconnected with one end of the resistor of each series arm being connected to the junction of said series and shunt arms to form a cascaded network;
a second diode in series with each first diode;
a DC control voltage source connected across all of the series pairs of diodes and establishing the same predetermined level of conduction current in each first diode;
means for coupling the input signal across the first L-shaped impedance section of said cascaded network; and
means for extracting an output signal across the first diode of the last L-shaped impedance section of said cascaded network